United States Patent
Donners et al.

(10) Patent No.: US 12,331,173 B2
(45) Date of Patent: Jun. 17, 2025

(54) PROCESS FOR PRODUCING GLASS FIBER-REINFORCED COMPOSITION

(71) Applicant: SABIC GLOBAL TECHNOLOGIES B.V., Bergen op Zoom (NL)

(72) Inventors: Rob Donners, Geleen (NL); Zahra Fahimi, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 720 days.

(21) Appl. No.: 17/609,996

(22) PCT Filed: May 11, 2020

(86) PCT No.: PCT/EP2020/063053
§ 371 (c)(1),
(2) Date: Nov. 9, 2021

(87) PCT Pub. No.: WO2020/229411
PCT Pub. Date: Nov. 19, 2020

(65) Prior Publication Data
US 2022/0235185 A1 Jul. 28, 2022

(30) Foreign Application Priority Data
May 13, 2019 (EP) .................................. 19174085

(51) Int. Cl.
| B29B 9/14 | (2006.01) |
| B29C 48/05 | (2019.01) |
| C08J 5/04 | (2006.01) |
| C08J 5/08 | (2006.01) |
| B29B 7/90 | (2006.01) |
| B29C 48/285 | (2019.01) |

(52) U.S. Cl.
CPC ................ *C08J 5/043* (2013.01); *B29B 9/14* (2013.01); *B29C 48/05* (2019.02); *C08J 5/08* (2013.01); *B29B 7/90* (2013.01); *B29C 48/2886* (2019.02); *C08J 2323/12* (2013.01)

(58) Field of Classification Search
CPC .... B29B 7/90; B29B 9/14; C08J 5/043; C08J 2323/12; C08J 5/08; B29C 48/05; B29C 48/2886

USPC .......................................................... 524/494
See application file for complete search history.

(56) References Cited

U.S. PATENT DOCUMENTS

| 4,338,233 | A | 7/1982 | Das et al. |
| 5,017,714 | A | 5/1991 | Welborn, Jr. |
| 5,324,820 | A | 6/1994 | Baxter |
| 5,525,423 | A | 6/1996 | Liberman et al. |
| 9,900,543 | B1 | 2/2018 | Liu |
| 2014/0335329 | A1 | 11/2014 | Abayasinghe et al. |
| 2016/0279833 | A1 | 9/2016 | Tufano et al. |
| 2017/0100855 | A1 | 4/2017 | Taylor |

FOREIGN PATENT DOCUMENTS

| DE | 102018122890 A1 | 3/2019 |
| EP | 0206189 B1 | 10/1990 |
| EP | 0397505 B1 | 12/1994 |
| EP | 0994978 B1 | 10/2004 |
| EP | 0921919 B1 | 7/2005 |
| EP | 1460166 B1 | 10/2015 |
| JP | H06114830 A | 4/1994 |
| WO | 9806551 A2 | 2/1998 |
| WO | 9900543 A1 | 1/1999 |
| WO | 2009080281 A1 | 7/2009 |
| WO | 2014053590 A1 | 4/2014 |
| WO | 2015071118 A1 | 5/2015 |
| WO | 2017180826 A1 | 10/2017 |

OTHER PUBLICATIONS

International Search Report and Written Opinion; International Application No. PCT/EP2020/063053; International Filing Date May 11, 2020; Date of Mailing Jul. 22, 2020; 12 Pages.

*Primary Examiner* — Ruiyun Zhang
(74) *Attorney, Agent, or Firm* — CANTOR COLBURN LLP

(57) ABSTRACT

The invention relates to a process for producing a glass fiber-reinforced thermoplastic polymer composition, comprising the sequential steps of: a) unwinding from a first package of at least one first continuous glass multifilament strand having a first filament thickness t1 and a second package of at least one second continuous glass multifilament strand having a second filament thickness t2 larger than the first filament thickness t1 and b) applying a sheath of a thermoplastic polymer composition around the at least one first continuous glass multifilament strand and the at least one second continuous glass multifilament strand to form a sheathed continuous multifilament strand.

19 Claims, No Drawings

PROCESS FOR PRODUCING GLASS FIBER-REINFORCED COMPOSITION

CROSS REFERENCE TO RELATED APPLICATIONS

This application is a National Stage application of PCT/EP2020/063053, filed on May 11, 2020. which claims the benefit of European Application No. 19174085.1 filed on May 13, 2019, both of which are incorporated by reference in their entirety herein.

The present invention relates to a process for producing a glass fiber-reinforced thermoplastic polymer composition, comprising subsequent steps of unwinding from a package of a continuous glass multifilament strand and applying a sheath of polypropylene around said multifilament strand to form a sheathed continuous multifilament strand.

Such process is known from International application WO 2009/080281. This published patent application discloses a process for producing a long glass fiber-reinforced thermoplastic polymer composition, which comprises the subsequent steps of i) unwinding from a package of at least one continuous glass multifilament strand, ii) applying an impregnating agent to said at least one continuous glass multifilament strand to form an impregnated continuous multifilament strand, and iii) applying a sheath of thermoplastic polymer around the impregnated continuous multifilament strand to form a sheathed continuous multifilament strand. WO 2009/080281 does not disclose the application of one sheath around more than one glass multifilament strands.

US2016279833 discloses the application of one sheath around at least two glass multifilament strands.

Various properties are important for such compositions. For example, a certain amount of glass fibers are mechanically disengaged from long glass fiber reinforced compositions, which is so-called free glass. The amount of such free glass should desirably be low. Further, the distribution of the glass fibers in the moulded article made from the composition should desirably be homogeneous. Additionally, mechanical properties of the composition such as impact strength and tensile properties are important.

It is an objective of the present invention to provide a long glass fiber-reinforced thermoplastic polymer composition which has balanced properties regarding free glass, glass fiber distribution and mechanical properties.

Accordingly, the present invention provides a process for producing a glass fiber-reinforced thermoplastic polymer composition, comprising the sequential steps of:

a) unwinding from a first package of at least one first continuous glass multifilament strand having a first filament thickness t1 and a second package of at least one second continuous glass multifilament strand having a second filament thickness t2 larger than the first filament thickness t1 and b) applying a sheath of a thermoplastic polymer composition around the at least one first continuous glass multifilament strand and the at least one second continuous glass multifilament strand to form a sheathed continuous multifilament strand comprising the at least one first continuous glass multifilament strand and the at least one second continuous glass multifilament strand.

Surprisingly, the inventors have found that the amount of free glass is decreased by the use of strands with a small thickness and thus the problem of the free glass can be solved by the choice of the thickness. The small thickness also gives better results in terms of tensile properties.

However, it was also observed that the use of strands with a small thickness results in a worse result in terms of glass fiber distribution.

Accordingly, the inventors have realized that the use of strands with two different thicknesses provides a composition which has balanced properties regarding free glass, glass fiber distribution and mechanical properties.

Step a)

Continuous Glass Multifilament Strand

Glass fibers are generally supplied as a plurality of continuous, very long filaments, and can be in the form of strands, rovings or yarns. A filament is an individual fiber of reinforcing material. A strand is a plurality of bundled filaments. Yarns are collections of strands, for example strands twisted together. A roving refers to a collection of strands wound into a package. Glass multifilament strands and their preparation are known in the art.

For purpose of the invention, a glass multifilament strand is defined as a plurality of bundled glass filaments.

The thicknesses of the filaments in a continuous glass multifilament strand are substantially the same, although it will be appreciated that there may be small variations. Accordingly, the first continuous glass multifilament strand having a first filament thickness t1 means that the strand consists of filaments each having a thickness substantially equal to t1. The term "substantially equal to t1" may mean that the difference between the thickness of the filament and t1 is at most 15% of t1.

Similarly, the second continuous glass multifilament strand having a second filament thickness t2 means that the strand consists of filaments each having a thickness substantially equal to t2. The term "substantially equal to t2" may mean that the difference between the thickness of the filament and t2 is at most 15% of t2.

According to the present invention, at least a first strand having a filament thickness t1 and a second strand having a filament thickness t2 are used. The filament thickness t2 is larger than t1. Preferably, t2 is at least 1 µm larger than t1, for example 1 to 30 µm or 5 to 20 µm larger than t1.

Preferably, t1 is 1 to 45 µm, for example 2 to 40 µm, 3 to 30 µm, 5 to 20 µm or 10 to 15 µm.

Preferably, t2 is 3 to 50 µm, for example 5 to 45 µm, 10 to 40 µm, 15 to 35 µm or 20 to 30 µm.

In particularly preferred embodiments, t1 is 10 to 15 µm and t2 is 20 to 30 µm.

Usually the glass filaments in the multifilament strands are circular in cross section, meaning the thickness as defined above would mean diameter. For example, if the glass filaments in the multifilament strands are polygonal in cross section, meaning the thickness as defined above would be 2d wherein d is the distance between the geometrical center of the polygon and the nearest side to the geometrical center.

The strand density of the continuous glass multifilament strand may vary within wide limits. For example, the continuous glass multifilament strand may have at least 500, for example at least 1000 glass filaments/strand and/or at most 10000, for example at most 5000 grams per 1000 meter. Preferably, the amount of glass filaments/strands is in the range from 500 to 10000 grams per 1000 meter glass filaments/strand.

The length of the glass filament strand is in principle not limited as it is substantially equal to the length of the sheathed continuous multifilament strand. For practical reasons of being able to handle the sheathed continuous multifilament strand however, it may be necessary to cut the sheathed continuous multifilament strand into a shorter strand. For example the length of the sheathed continuous multifilament strand is at least 1 m, for example at least 10 m, for example at least 50 m, for example at least 100 m, for example at least 250 m, for example at least 500 m and/or for example at most 25 km, for example at most 10km.

Preferably, the continuous glass multifilament strand in the composition of the invention comprises at most 2 wt %, preferably in the range from 0.10 to 1 wt % of a sizing based on the continuous glass multifilament strand. The amount of sizing can be determined using ISO 1887:2014.

A sizing composition is typically applied to the glass filaments before the glass filaments are bundled into a continuous glass multifilament strand.

Suitable examples of sizing compositions include solvent-based compositions, such as an organic material dissolved in aqueous solutions or dispersed in water and melt- or radiation cure-based compositions. Preferably, the sizing composition is an aqueous sizing composition.

As described in the art, e.g. in documents EP1460166A1, EP0206189A1 or U.S. Pat. No. 4,338,233, the aqueous sizing composition may include film formers, coupling agents and other additional components.

The film formers are generally present in effective amount to protect fibers from interfilament abrasion and to provide integrity and processability for fiber strands after they are dried. Suitable film formers are miscible with the polymer to be reinforced. For example; for reinforcing polypropylenes, suitable film formers generally comprise polyolefin waxes.

The coupling agents are generally used to improve the adhesion between the matrix thermoplastic polymer and the fiber reinforcements. Suitable examples of coupling agents known in the art as being used for the glass fibers include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. Preferably, in the tape of the invention, the sizing composition contains an aminosilane to enable a good adhesion to the thermoplastic matrix. The sizing composition may further comprise any other additional components known to the person skilled in the art to be suitable for sizing compositions. Suitable examples include but are not limited to lubricants (used to prevent damage to the strands by abrasion) antistatic agents, crosslinking agents, plasticizers, surfactants, nucleation agents, antioxidants, pigments as well as mixtures thereof.

Typically, after applying the sizing composition to the glass filaments, the filaments are bundled into the continuous glass multifilament strands and then wound onto bobbins to form a package.

Step a1)

Impregnating Agent

Preferably, the process further comprises step a1) between steps a) and b). Step a1) is a step of applying an impregnating agent to each of the continuous glass multifilament strands to which the sheath is to be applied in step b).

The impregnating agent may be applied to each of said continuous glass multifilament strands together or separately.

The optimal amount of impregnating agent applied to the continuous glass multifilament strand depends on the polymer sheath, on the thickness (diameter) of the glass filaments forming the continuous glass strand, and on the type of sizing composition. Typically, the amount of impregnating agent applied to the continuous glass multifilament strand is at least 0.50 wt %, preferably at least 1.0 wt %, preferably at least 1.5 wt %, preferably at least 2 wt %, preferably at least 2.5 wt % and/or at most 18.0 wt %, preferably at most 15.0 wt %, for example at most 10.0 wt %, at most 9.0 wt %, at most 8.0 wt %, at most 7.0 wt %, at most 6.0 wt %, at most 5.5 wt % based on the amount of sheathed continuous multifilament strands. A higher amount of impregnating agent increases the Impact Energy per unit of thickness (J/mm). However, for reasons of cost-effectiveness and low emissions (volatile organic compounds) and mechanical properties, the amount of impregnating agent should also not become too high.

For example, the ratio of impregnating agent to continuous glass multifilament strand is in the range from 1:4 to 1:30, preferably in the range from 1:5 to 1:20.

Preferably, the viscosity of the impregnating agent is in the range from 2.5 to 200 cSt at 160° C., more preferably at least 5.0 cSt, more preferably at least 7.0 cSt and/or at most 150.0 cSt, preferably at most 125.0 cSt, preferably at most 100.0cSt at 160° C.

An impregnating agent having a viscosity which is too high is difficult to apply to the continuous glass multifilament strand. Low viscosity is needed to facilitate good wetting performance of the fibres, but an impregnating agent having a viscosity lower than 2.5 cSt is difficult to handle, e.g., the amount to be applied is difficult to control; and the impregnating agent could become volatile. For purpose of the invention, unless otherwise stated, the viscosity of the impregnating agent is measured in accordance with ASTM D 3236-15 (standard test method for apparent viscosity of hot melt adhesives and coating materials) at 160° C.

Preferably, the melting point of (that is the lowest melting temperature in a melting temperature range) the impregnating agent is at least 20° C. below the melting point of the thermoplastic polymer composition. More preferably, the impregnating agent has a melting point of at least 25 or 30° C. below the melting point of the thermoplastic polymer composition. For instance, when the thermoplastic polymer composition has a melting point of about 160° C., the melting point of the impregnating agent may be at most about 140° C.

Suitable impregnating agents are compatible with the thermoplastic polymer to be reinforced, and may even be soluble in said polymer. The skilled man can select suitable combinations based on general knowledge, and may also find such combinations in the art.

Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as highly branched polyethylenes and polypropylenes, polyamides, such as nylons, and other hydrocarbon resins.

For reinforcing polypropylenes, the impregnating agent preferably comprises highly branched poly(alpha-olefins), such as highly branched polyethylenes, modified low molecular weight polypropylenes, mineral oils, such as, paraffin or silicon and any mixtures of these compounds.

The impregnating agent preferably comprises at least 20 wt %, more preferably at least 30 wt %, more preferably at least 50 wt %, for example at least 99.5 wt %, for example 100 wt % of a branched poly(alpha-olefin), most preferably a branched polyethylene. To allow the impregnating agent to reach a viscosity of from 2.5 to 200 cSt at 160° C., the branched poly(alpha-olefin) may be mixed with an oil, wherein the oil is chosen from the group consisting of mineral oils, such as a paraffin oil or silicon oil; hydrocarbon oils; and any mixtures thereof.

Preferably, the impregnating agent is non-volatile, and/or substantially solvent-free. In the context of the present invention, non-volatile means that the impregnating agent has a boiling point or range higher than the temperatures at which the impregnating agent is applied to the continuous multifilament glass strand. In the context of present invention, "substantially solvent-free" means that impregnating agent contains less than 10 wt % of solvent, preferably less than 5wt % of solvent based on the impregnating agent. In a preferred embodiment, the impregnating agent does not contain any organic solvent.

The impregnating agent may further be mixed with other additives known in the art. Suitable examples include lubricants; antistatic agents; UV stabilizers; plasticizers; surfactants; nucleation agents; antioxidants; pigments; dyes; and adhesion promoters, such as a modified polypropylene having maleated reactive groups; and any combinations thereof, provided the viscosity remains within the desired range. Any method known in the art may be used for applying the liquid impregnating agent to the continuous glass multifilament strand. The application of the liquid impregnating agent may be performed using a die. Other suitable methods for applying the impregnating agent to the continuous multifilament strands include applicators having belts, rollers, and hot melt applicators. Such methods are for example described in documents EP0921919B1 EP0994978B1, EP0397505B1, WO2014/053590A1 and references cited therein. The method used should enable application of a constant amount of impregnating agent to the continuous multifilament strand.

Step b)
Polymer Sheath

The polymer sheath consists of a thermoplastic polymer composition.

Preferably, the melt flow index (MFI) of the thermoplastic polymer is at least 1 dg/min, for example in the range from 20 to 150 dg/min, preferably in the range from 25 to 120 dg/min, for example in the range from 35 to 100 dg/min as measured according to ISO1133-1:2011 (2.16 kg/230° C.).

The thermoplastic polymer composition preferably comprises a thermoplastic polymer.

Suitable examples of thermoplastic polymers include but are not limited to polyamide, such as polyamide 6, polyamide, 66 or polyamide 46; polyolefins, for example polypropylenes and polyethylenes; polyesters, such as polyethylene terephthalate, polybutylene terephthalate; polycarbonates; polyphenylene sulphide; polyurethanes and mixtures thereof.

The thermoplastic polymer is preferably a polyolefin, more preferably a polyolefin chosen from the group of polypropylenes or elastomers of ethylene and α-olefin comonomer having 4 to 8 carbon atoms, and any mixtures thereof.

In one embodiment, preferably the thermoplastic polymer composition comprises at least 80 wt % of a thermoplastic polymer, for example at least 90 wt % polyolefin, at least 93 wt %, for example at least 95 wt %, for example at least 97 wt % of thermoplastic polymer, for example at least 98 wt % or for example at least 99 wt % of a thermoplastic polymer based on the thermoplastic polymer composition. In a special embodiment, the thermoplastic polymer composition consists of a thermoplastic polymer.

In another embodiment, the thermoplastic polymer composition comprises at least 60 wt %, for example at least 70 wt %, for example at least 75 wt % and/or at most 99 wt %, for example at most 95 wt %, for example at most 90 wt % thermoplastic polymer.

The polypropylene may for example be a propylene homopolymer or a random propylene-α-olefin copolymer or a heterophasic propylene copolymer.

A propylene homopolymer can be obtained by polymerizing propylene under suitable polymerization conditions. A propylene copolymer can be obtained by copolymerizing propylene and one or more other α-olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

The α-olefin in the random propylene α-olefin copolymer is for example an α-olefin chosen from the group of α-olefin having 2 or 4 to 10 C-atoms, preferably ethylene, 1-butene, 1-hexene or any mixtures thereof. The amount of α-olefin is preferably at most 10 wt % based on the propylene α-olefin copolymer, for example in the range from 2-7 wt % based on the propylene α-olefin copolymer.

Polypropylenes can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Heterophasic propylene copolymers are generally prepared in one or more reactors, by polymerization of propylene in the presence of a catalyst and subsequent polymerization of a propylene-α-olefin mixture. The resulting polymeric materials are heterophasic, but the specific morphology usually depends on the preparation method and monomer ratio.

The heterophasic propylene copolymer as defined herein consists of a propylene-based matrix and a dispersed ethylene-α-olefin copolymer.

The propylene-based matrix typically forms the continuous phase in the heterophasic propylene copolymer.

The propylene-based matrix consists of a propylene homopolymer and/or a propylene copolymer consisting of at least 70 wt % of propylene monomer units and at most 30 wt % of comonomer units selected from ethylene monomer units and α-olefin monomer units having 4 to 10 carbon atoms, for example consisting of at least 80 wt % of propylene monomer units and at most 20 wt % of the comonomer units, at least 90 wt % of propylene monomer units and at most 10 wt % of the comonomer units or at least 95 wt % of propylene monomer units and at most 5 wt % of the comonomer units, based on the total weight of the propylene-based matrix.

Preferably, the comonomer in the propylene copolymer of the propylene-based matrix is selected from the group of ethylene, 1-butene, 1-pentene, 4-methyl-1-pentene, 1-hexen, 1-heptene and 1-octene, and is preferably ethylene.

Preferably, the propylene-based matrix consists of a propylene homopolymer.

The melt flow index (MFI) of the propylene-based matrix (before it is mixed into the composition of the invention) may be in the range of for example 0.3 to 200 dg/min as measured according to ISO1133-1:2011 (2.16 kg/230° C.).

The propylene-based matrix is for example present in an amount of 50 to 85 wt % based on the total heterophasic propylene copolymer.

Besides the propylene-based matrix, the heterophasic propylene copolymer also consists of a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form.

The MFI of the dispersed ethylene α-olefin copolymer may vary between wide range and may for example be in the range from for example be in the range from 0.001 to 10 dg/min (measured according to ISO1133 (2.16 kg/230° C. as calculated using the following formula:

$$MFI\ EPR = 10^{\wedge}\left(\frac{\text{Log } MFI\ \text{heterophasic} - \text{matrix content} * \text{Log } MFI\ PP}{\text{rubber content}}\right)$$

wherein MFI heterophasic is the melt flow index of the heterophasic propylene copolymer measured according to ISO1133-1:2011(2.16 kg/230° C.), MFI PP is the MFI of the propylene-based matrix of the heterophasic propylene copolymer measured according to ISO1133 (2.16 kg/230° C.), matrix content is the fraction of propylene-based matrix in the heterophasic propylene copolymer and rubber content is the fraction of ethylene α-olefin copolymer in the heterophasic propylene copolymer. The sum of the matrix content and the rubber content is 1. For the avoidance of any doubt, Log in the formula means $\log_{10}$.

The dispersed ethylene-α-olefin copolymer is for example present in an amount of 50 to 15 wt % based on the total heterophasic propylene copolymer.

For example, the amount of ethylene monomer units in the ethylene-α-olefin copolymer (RCC2) is in the range of 20-65 wt % based on the ethylene-α-olefin copolymer.

The amounts of the propylene-based matrix and the dispersed ethylene-α-olefin copolymer, as well as the amount of ethylene in the ethylene α-olefin copolymer may be determined by $^{13}$C-NMR, as is well known in the art.

In the heterophasic polypropylene, the sum of the total weight of the propylene-based matrix and the total weight of the dispersed ethylene-α-olefin copolymer is 100 wt %

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

The elastomer of ethylene and α-olefin comonomer having 4 to 8 carbon atoms may for example have a density in the range from 0.850 to 0.915 g/cm³. Such elastomers are sometimes also referred to as plastomers.

The α-olefin comonomer in the elastomer is preferably an acyclic monoolefin such as 1-butene, 1-pentene, 1-hexene, 1-octene, or 4-methylpentene.

Accordingly, the elastomer is preferably selected from the group consisting of ethylene-1-butene copolymer, ethylene-1-hexene copolymer, ethylene-1-octene copolymer and mixtures thereof, more preferably wherein the elastomer is selected from ethylene-1-octene copolymer. Most preferably, the elastomer is an ethylene-1-octene copolymer.

Preferably, the density of the elastomer is at least 0.865 g/cm³ and/or at most 0.910 g/cm³. For example, the density of the elastomer is at least 0.850, for example at least 0.865, for example at least 0.88, for example at least 0.90 and/or for example at most 0.915, for example at most 0.910, for example at most 0.907, for example at most 0.906 g/cm³. More preferable the density of the elastomer is in the range from 0.88 up to an including 0.907 g/cm³, most preferably, the density of the elastomer is in the range from 0.90 up to and including 0.906 g/cm³.

Elastomers which are suitable for use in the current invention are commercially available for example under the trademark EXACT™ available from Exxon Chemical Company of Houston, Tex. or under the trademark ENGAGE™ polymers, a line of metallocene catalyzed plastomers available from Dow Chemical Company of Midland, Mich. or under the trademark TAFMER™ available from MITSUI Chemicals Group of Minato Tokyo or under the trademark Nexlene™ from SK Chemicals.

The elastomers may be prepared using methods known in the art, for example by using a single site catalyst, i.e., a catalyst the transition metal components of which is an organometallic compound and at least one ligand of which has a cyclopentadienyl anion structure through which such ligand bondingly coordinates to the transition metal cation. This type of catalyst is also known as "metallocene" catalyst. Metallocene catalysts are for example described in U.S. Pat. Nos. 5,017,714 and 5,324,820. The elastomer s may also be prepared using traditional types of heterogeneous multi-sited Ziegler-Natta catalysts.

Preferably, the elastomer has a melt flow index of 0.1 to 40 dg/min (ISO1133, 2.16 kg, 190° C.), for example at least 1 dg/min and/or at most 35 dg/min. More preferably, the elastomer has a melt flow index of at least 1.5 dg/min, for example of at least 2 dg/min, for example of at least 2.5 dg/min, for example of at least 3 dg/min, more preferably at least 5 dg/min and/or preferably at most 30 dg/min, more preferably at most 20 dg/min, more preferably at most 10 dg/min measured in accordance with ISO 1133 using a 2.16 kg weight and at a temperature of 190° C.

Preferably, the amount of ethylene incorporated into the elastomer is at least 50 mol %. More preferably, the amount of ethylene incorporated into the elastomer is at least 57 mol %, for example at least 60 mol %, at least 65 mol % or at least 70 mol %. Even more preferably, the amount of ethylene incorporated into the elastomer is at least 75 mol %. The amount of ethylene incorporated into the elastomer may typically be at most 97.5 mol %, for example at most 95 mol % or at most 90 mol %.

The thermoplastic polymer composition may contain the usual additives, for instance nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti-microbials, anti-fogging additives, slip additives, anti-blocking additives, polymer processing aids and the like. Such additives are well known in the art. Another example of the additives is a coupling agent, which may or may not be of the same type as the coupling agent which may be present in the aqueous sizing composition. The skilled person will know how to choose the type and amount of additives such that they do not detrimentally influence the aimed properties. In a special embodiment, the thermoplastic polymer composition consists of the thermoplastic polymer and additives.

Preferably, the amount of glass is in the range of 10 to 70 wt %, for example in the range from 15 to 65 wt %, for example in the range from 20 to 60 wt % or for example in the range from 25 to 55 wt % based on the sheathed continuous multifilament strands.

Preferably, the amount of impregnated continuous multifilament strand is in the range of 10 to 70 wt %, for example in the range from 15 to 65 wt %, for example in the range from 20 to 60 wt % or for example in the range from 25 to 55 wt % based on the sheathed continuous multifilament strands. Preferably, the sum of the amount of impregnated continuous multifilament strand and the polymer sheath is 100 wt %.

The process according to the present invention may involve use of one or more continuous glass multifilament strands in addition to the first and the second continuous glass multifilament, having a different filament thickness than the filament thicknesses of the first and the second continuous glass multifilaments.

Accordingly, in some embodiments, step a) involves unwinding from a third package of at least one third continuous glass multifilament strand having a third filament thickness t3, wherein t3 is different from t1 and t2 and step b) involves applying the sheath around the at least one third continuous glass multifilament and the sheathed continuous multifilament strand further comprises the at least one third continuous glass multifilament.

Preferably, the process further comprises the step of cutting the sheathed continuous glass multifilament strand into pellets. Any suitable method known in the art, such as use of the devices mentioned in document EP0994978B1, may be used in present invention. The length of the glass fibres in the pellets or granules is typically substantially the same as the pellet or granule length, and may vary from 0.8 to 50 mm, preferably from 2 to 50 mm, preferably from 5 to 30 mm, more preferably from 6 to 20 and most preferably from 10 to 15 mm.

In another aspect, the invention relates to the glass fibre-reinforced thermoplastic polymer composition obtained or obtainable by the process according to the invention.

In another aspect, the invention provides a glass fiber-reinforced thermoplastic polymer composition comprising a sheathed continuous multifilament strand comprising at least one first glass multifilament strand having a first filament thickness t1 and at least one second continuous glass multifilament strand having a second filament thickness t2 larger than the first filament thickness t1 and a sheath of a thermoplastic polymer composition provided around the at least one first continuous glass multifilament strand and the at least one second continuous glass multifilament. Such glass fiber-reinforced thermoplastic polymer composition may comprise further components described in relation to the process according to the invention and the glass fibre-reinforced thermoplastic polymer composition obtained or obtainable thereby. Suitable examples of the components present in such glass fiber-reinforced thermoplastic polymer composition are those explained in relation to the process according to the invention and the glass fibre-reinforced thermoplastic polymer composition obtained or obtainable thereby. It is particularly mentioned that: It is preferred that the first glass multifilament strand and the second glass multifilament strand in the glass fiber-reinforced thermoplastic polymer composition are the same first glass multifilament strand and the same second glass multifilament strand as aforementioned in Step a); It is preferred that the glass fiber-reinforced thermoplastic polymer composition further comprises an impregnating agent between the glass multifilament strands and the sheath of a thermoplastic polymer composition wherein the impregnating agent is the same impregnating agent as aforementioned in Step a1); It is preferred that the thermoplastic polymer composition in the glass fiber-reinforced thermoplastic polymer composition is the same thermoplastic polymer composition as aforementioned in Step b). In another aspect, the invention provides pellets consisting of such glass fiber-reinforced thermoplastic polymer composition, wherein the length of the glass fibres in the pellets is typically substantially the same as the pellet length, and may vary from 0.8 to 50 mm, preferably from 2 to 50 mm, preferably from 5 to 30 mm, more preferably from 6 to 20 and most preferably from 10 to 15 mm.

In another aspect, the invention relates to moulding the glass fibre-reinforced thermoplastic polymer composition into an article.

In another aspect, the invention relates to an article comprising the composition according to the invention. The article can for example be used in an automotive application.

In another aspect, the invention relates to use of the composition according to the invention for making an automotive article.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Several long glass fiber-reinforced polypropylene compositions were produced. The respective amounts of the components of the compositions are shown in Table 1.

One or two types of continuous glass multifilament strands, depending on the example, were unwound from the packages and transported to the impregnating agent applicator. The impregnating agent, similar to the impregnating agent disclosed in WO2009/0808231, was molten and mixed at a temperature of 160° C. and applied to the continuous glass multifilament strand after unwinding from the package by using an applicator.

The impregnating step was carried out in a single step on the continuous glass multifilament strands.

The sheathing step was performed in-line directly after the impregnating step, using a 75 mm twin screw extruder (manufactured by Berstorff, screw UD ratio of 34), at a temperature of about 250° C., which fed the molten polypropylene matrix material and additives to an extruder-head wire-coating die. The sheathed strand was cut into pellets of 15 mm length. The pellets were moulded into appropriate shapes for the measurements of various properties as given in Table 2.

The homogeneity of the distribution of the glass fibers in the moulded article was determined by the following method:

15 plaques with dimension 310 mm*270 mm*3 mm were made by injection moulding of the pellets according to the conditions in the table below. The pellets have a black color due to the color masterbatch. When the glass fibers are poorly dispersed, more glass fibers appear on the surface of the plaques as "white spots" on the black plaques. The number of white spots was counted and an average of the 15 plaques was determined, which represents the degree of inhomogeneity of the distribution of the glass fibers in the moulded article.

| | |
|---|---|
| Feed temperature | 260° C. |
| Mould temperature at injection side | 40° C. |
| Mould temperature at closing side | 50° C. |
| Injection pressure | 1300 bar |

TABLE 1

| Composition | wt % |
|---|---|
| GF1 and/or GF2 | 30.12 |
| Impregnating agent | 2.64 |
| PP1 or PP2 | 63.42 |
| Light stabilizer | 0.12 |
| Antioxidant | 0.4 |
| Coupling agent | 3 |
| Color masterbatch | 0.3 |
| Total | 100 |

PP1 is a propylene homopolymer having an MFI (ISO1133-1:2011, 230° C./2.16 kg) of 50 dg/min PP2 is a propylene-ethylene copolymer with an ethylene content of 53 wt %, having an MFI (ISO1133-1:2011, 230° C./2.16 kg) of 70 dg/min.

GF1 is standard Type 30 roving SE4220, supplied by 3B as a roving package, having filament diameter of 12 μm and contain aminosilane-containing sizing composition. GF2 is standard Type 30 roving SE4220, supplied by 3B as a roving package, having filament diameter of 24 μm and contain aminosilane-containing sizing composition.

Coupling agent is polypropylene grafted with maleic anhydride; commercial name Exxelor 1020.

TABLE 2

| | | CEx 1 | Ex 2 | CEx 3 | CEx 4 | Ex 5 | CEx 6 |
|---|---|---|---|---|---|---|---|
| Polypropylene | | PP1 | PP1 | PP1 | PP2 | PP2 | PP2 |
| Glass fibers | | 100 wt % GF1 | 50 wt % GF1-50 wt % GF2 | 100 wt % GF2 | 100 wt % GF1 | 50 wt % GF1-50 wt % GF2 | 100 wt % GF2 |
| White spot | | 11.2 | 5.9 | 0.9 | 21.3 | 11.3 | 1.5 |
| Tensile strength (@23° C. after 7 days) | N/mm2 | 112 | 104.4 | 97.9 | 103.6 | 97.4 | 89.5 |
| Tensile strength (@120° C. after 7 days) | N/mm2 | 48.7 | 41.4 | 35.7 | 37.6 | 32 | 28.5 |
| Isotropic Tensile Modulus @ 120° C. after 7 days | N/mm2 | 1991.1 | 1933 | 1816.8 | 1953.7 | 1849 | 1628.3 |
| Free glass cold | gr/kg | 0.0342 | 0.0615 | 0.6256 | 0.0449 | 0.0407 | 0.1537 |
| Free glass after heat treatment | gr/kg | 0.015 | 0.0653 | 0.576 | 0.0234 | 0.0258 | 0.0713 |

The tensile strength was measured according to ISO527/1A(II) after conditioning for 7 days at 23° C. or 7 days at 120° C.

The isotropic tensile modulus was measured according to ISO 527/1B (0°, 45°, 90°) after conditioning for 7 days at 120° C.

The free glass was measured by the following method:

1 kg of the obtained pellets was passed through a suction pipe having a length of 2 m which has 6 bends (180 degree bend) by a suction pressure of 260 mbar at 50 Hz. At the end of the suction pipe, a container and a filter having a hole size lower than the fiber diameter are provided. The container receives the pellets and the filter catches the free glass. The weight of the free glass present in the filter was measured and divided by the initial weight of the pellets, i.e. 1 kg, which result represents the free glass.

The use of only glass multifilament strands with a large diameter led to a large amount of free glass (CEx 3, CEx 6). Mixing of glass multifilament strands with a small diameter drastically reduced the free glass (Ex 2, Ex 5). The tensile strength and the tensile modulus also became much higher by the mixture compared to the use of only glass multifilament strands with a large diameter. The difference is especially large after the samples are subjected to a high temperature.

A further reduction of the free glass as well as a further improvement in the tensile strength and the tensile modulus were observed by using glass multifilament strands with a small diameter (CEx 1, CEx 4). However, the white spot, i.e. the inhomogeneity of the distribution of the glass fibers, became unacceptably high. Ex 2 and Ex 5 which use two types of glass multifilament strands with different diameters have a good balance of low free glass, high tensile properties and low white spot.

The invention claimed is:

1. A glass fiber-reinforced thermoplastic polymer composition comprising
a sheathed continuous multifilament strand comprising at least one first continuous glass multifilament strand having a first filament thickness t1 and at least one second continuous glass multifilament strand having a second filament thickness t2 larger than the first filament thickness t1 and a sheath of a thermoplastic polymer composition provided around the at least one first continuous glass multifilament strand and the at least one second continuous glass multifilament strand, wherein t2 is at least 1 μm larger than t1,
wherein t2 is 5 to 20 μm larger than t1.

2. An article comprising the composition according to claim 1.

3. The glass fiber-reinforced thermoplastic polymer composition according to claim 1, wherein t1 is 1 to 45 μm.

4. The glass fiber-reinforced thermoplastic polymer composition according to claim 1, wherein the thermoplastic polymer composition comprises at least 80 wt % of a thermoplastic polymer.

5. The glass fiber-reinforced thermoplastic polymer composition according to claim 4, wherein thermoplastic polymer comprises a polypropylene, an elastomer of ethylene and α-olefin comonomer having 4 to 8 carbon atoms, or a combination thereof.

6. The glass fiber-reinforced thermoplastic polymer composition according to claim 1, wherein the melt flow index of the thermoplastic polymer composition is in the range from 20 to 150 dg/min as measured according to ISO1133-1:2011 (2.16 kg/230° C.).

7. The glass fiber-reinforced thermoplastic polymer composition according to claim 1, wherein an amount of glass is in a range of 10 to 70 wt % based on a total weight of the sheathed continuous multifilament strand.

8. The glass fiber-reinforced thermoplastic polymer composition according to claim 1, further comprising 0.5 to 18 wt % of an impregnating agent, based on a total weight of the sheathed continuous multifilament strand.

9. The glass fiber-reinforced thermoplastic polymer composition according to claim 8, wherein the impregnating agent has a melting point of at least 20° C. below the melting point of the thermoplastic polymer composition and has a viscosity of from 2.5 to 200cSt at 160° C.

10. The glass fiber-reinforced thermoplastic polymer composition according to claim 1, wherein t1 is 10 to 15 μm.

11. The glass fiber-reinforced thermoplastic polymer composition according to claim 1, wherein t2 is 20 to 30 μm.

12. The glass fiber-reinforced thermoplastic polymer composition according to claim 1, wherein t1 is 10 to 15 μm and t2 is 20 to 30 μm.

13. The glass fiber-reinforced thermoplastic polymer composition according to claim 1 obtained by a process comprising:
a) unwinding from a first package of at least one first continuous glass multifilament strand having the first filament thickness t1 and a second package of at least one second continuous glass multifilament strand having the second filament thickness t2 larger than the first filament thickness t1, and b) applying a sheath of a thermoplastic polymer composition around the at least one first continuous glass multifilament strand and the at least one second continuous glass multifilament strand to form a sheathed continuous multifilament strand comprising the at least one first continuous glass multifilament strand and the at least one second continuous glass multifilament strand.

14. A process for producing the glass fiber-reinforced thermoplastic polymer composition according to claim 1, comprising the sequential steps of:
a) unwinding from a first package of at least one first continuous glass multifilament strand having the first filament thickness t1 and a second package of at least one second continuous glass multifilament strand having the second filament thickness t2 larger than the first filament thickness t1 and
b) applying the sheath of the thermoplastic polymer composition around the at least one first continuous glass multifilament strand and the at least one second continuous glass multifilament strand to form the sheathed continuous multifilament strand comprising the at least one first continuous glass multifilament strand and the at least one second continuous glass multifilament strand.

15. The process according to claim 14, wherein the melt flow index of the thermoplastic polymer composition is in the range from 20 to 150 dg/min as measured according to ISO1133-1:2011 (2.16 kg/230° C.).

16. The process according to claim 14, wherein the amount of glass is in the range of 10 to 70 wt % based on the sheathed continuous multifilament strand.

17. The process according to claim 14, wherein the process further comprises between steps a) and b) the step a1) of applying an impregnating agent to each of the continuous glass multifilament strands to which the sheath is to be applied in step b); and wherein
the amount of impregnating agent in the sheathed continuous multifilament strand is 0.50 to 18 wt % based on the sheathed continuous multifilament strand, or
the amount of the impregnated continuous multifilament strands is in the range of 10 to 70 wt % based on the sheathed continuous multifilament strand and wherein the amount of the sheath is in the range of 30 to 90 wt % based on the sheathed continuous multifilament strand and wherein the sum of the amount of impregnated continuous multifilament strands and the sheath is 100 wt %.

18. The process according to claim 14, wherein the process further comprises the step of cutting the sheathed continuous glass multifilament strand into pellets.

19. The process according to claim 14, wherein
step a) involves unwinding from a third package of at least one third continuous glass multifilament strand having a third filament thickness t3, wherein t3 is different from t1 and t2 and
step b) involves applying the sheath around the at least one third continuous glass multifilament and the sheathed continuous multifilament strand further comprises the at least one third continuous glass multifilament.

* * * * *